United States Patent

[11] 3,623,158

[72] Inventors Roger J. Llewelyn
Romsey;
John F. Minshull, Winchester, both of England
[21] Appl. No. 875,234
[22] Filed Nov. 10, 1969
[45] Patented Nov. 23, 1971
[73] Assignee International Business Machines Corporation
Armonk, N.Y.
[32] Priority Nov. 12, 1968
[33] Great Britain
[31] 53,517/68

[54] DATA PROCESSING SYSTEM INCLUDING NONASSOCIATIVE DATA STORE AND ASSOCIATIVE WORKING AND ADDRESS STORES
12 Claims, 5 Drawing Figs.

[52] U.S. Cl. .......... 340/172.5
[51] Int. Cl. .......... G11c 7/00, G11c 9/00
[50] Field of Search .......... 340/172.5; 235/157

[56] References Cited

UNITED STATES PATENTS

| | | | |
|---|---|---|---|
| Re.26,171 | 3/1967 | Falkoff | 340/172.5 |
| 3,290,656 | 12/1966 | Lindquist | 340/172.5 |
| 3,290,659 | 12/1966 | Fuller et al. | 340/172.5 |
| 3,320,594 | 5/1967 | Davies | 340/172.5 |
| 3,388,381 | 6/1968 | Prywes et al. | 340/172.5 |
| 3,391,390 | 7/1968 | Crane et al. | 340/172.5 |

*Primary Examiner*—Gareth D. Shaw
*Attorneys*—Hanifin and Jancin and Edward S. Gershuny

ABSTRACT: An electronic data processing system comprising a nonassociative data store and four associative stores; a control store, a working store, a local store and an address store. The address store, under control of the control store, operates upon address data which is then used to address the data store. The working store and the address store may function simultaneously to provide improved instruction execution.

INVENTORS
ROGER J. LLEWELYN
JOHN F. MINSHULL

BY Edward S. Gershuny
ATTORNEY

FIG. 4

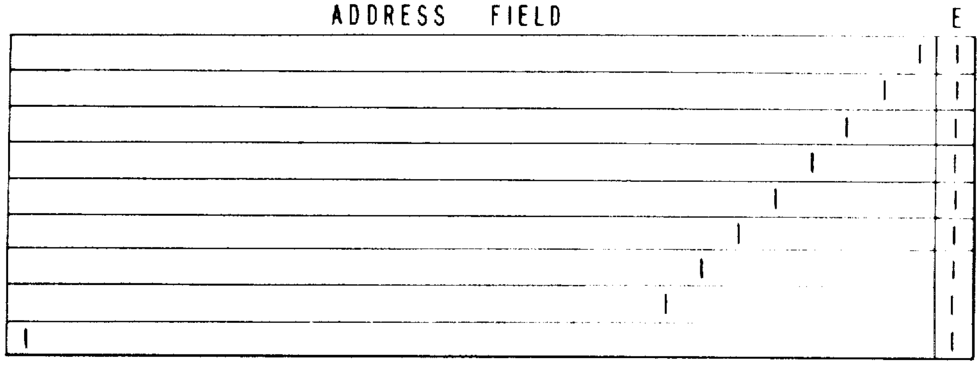

FIG. 5

| ADDRESS STORE | LOCAL STORE | WORKING STORE | DATA STORE |
|---|---|---|---|
| 1C + 2 PART 1 | | | |
| 1C + 2 PART 2 | | | |
| 1C + 2 PART 1 | | | READ |
| 1C + 2 PART 2 | SAVE OP CODE CC | OP DECODE | |
| STORE 1C | READ B2 BYTE 3 | | READ |
| | MOVE DISPLACEMENT BYTE 0 | ADD BYTE 3 | |
| SHIFT | READ B2 BYTE 2 | MAINTAIN DISPLACEMENT BYTE 0 | |
| MAINTAIN | | ADD BYTE 2 | |
| SHIFT | READ B2 BYTE 1 | | |
| MAINTAIN | READ OP CODE | ADD BYTE 1 | |
| SHIFT - PUT 1 IN BIT 30 | | OP DECODE | |
| SAVE EA | READ R1 BYTE 3 | | READ OPERAND 2 1st HALFWORD |
| | MOVE OP 2 BYTE 2 | ADD BYTE 3 | |
| | STORE BYTE 3 | MAINTAIN OP 2 BYTE 2 | |
| | READ R1 BYTE 2 | MAINTAIN OP 2 BYTE 2 ADD BYTE 2 | |
| EA - 2 | STORE BYTE 2 | | |
| | READ R1 BYTE 1 | | READ OPERAND 2 2nd HALFWORD |
| | MOVE OP 2 BYTE 0 | ADD BYTE 1 | |
| READ 1C | STORE BYTE 1 | MAINTAIN OP 2 BYTE 0 | |
| 1C + 2 PART 1 | READ R1 BYTE 0 | MAINTAIN OP 2 BYTE 0 | |
| 1C + 2 PART 2 | | ADD BYTE 0 | |
| | STORE BYTE 0 | GENERATE CC | |

DATA PROCESSING SYSTEM INCLUDING NONASSOCIATIVE DATA STORE AND ASSOCIATIVE WORKING AND ADDRESS STORES

BACKGROUND OF THE INVENTION

This invention relates to an electronic data processing system and is an improvement in and a modification of the electronic data processing system disclosed in the specification accompanying our copending application Ser. No. 828,503, filed May 28, 1969 now U.S. Pat. No. 3,585,605. The disclosure of said copending application is incorporated herein by this reference.

In that specification there is described interalia, an electronic data processing system including an associative control store, an associative working store, and an associative local store, wherein the control store stores control words each including working store and local store tags whereby data storage locations in working store and local store are selected for access, wherein the working store stores function tables whereby arithmetic and/or logical functions can be performed by table-look-up procedures, and wherein the local store stores operands on which arithmetic and/or logical operations are to be performed, the interconnections between the associative stores being such that when a control word is read from the control store, the working store and local store tags cause accessing of a particular function table and particular operands respectively, the particular operands being applied to the working store to cause accessing of the entry or entries in the accessed function table appropriate to the operands.

The specification also describes a system as above-recited, including a nonassociative data store and means for transferring data between the data store and the local store, wherein the local store stores an address operand representing a memory address in the data store and the working store stores a function table or tables for incrementing or decrementing the address operand.

In operation of the system as described in the specification of the copending application, a macro instruction and the operands defined by the macroinstruction were transferred from the data store to the local store and the operation code of the macroinstruction was used to initiate a microprogram which is executed under the control of microinstructions in the control store.

Critical examination of the execution of a macroinstruction revealed that about half the execution time was spent in executing certain well-defined functions on data store addresses.

SUMMARY OF THE INVENTION

Accordingly, this invention improves and modifies the invention of our copending application by the provision of an address store for the performance of at least some of these functions. By causing the address store to operate while the working store is executing the operation required by an instruction, a substantial improvement in instruction execution is obtained.

The scope of the invention is defined by the appended claims and how the invention may be performed is hereinafter described, by way of example, with reference to the accompanying drawings, in which:

FIGS. 3 and 4 are diagrams of function tables of the address store; and

FIG. 5 is a diagram indicating the various tasks performed during an instruction execution by the system of FIG. 1.

DETAILED DESCRIPTION

Figure 1:
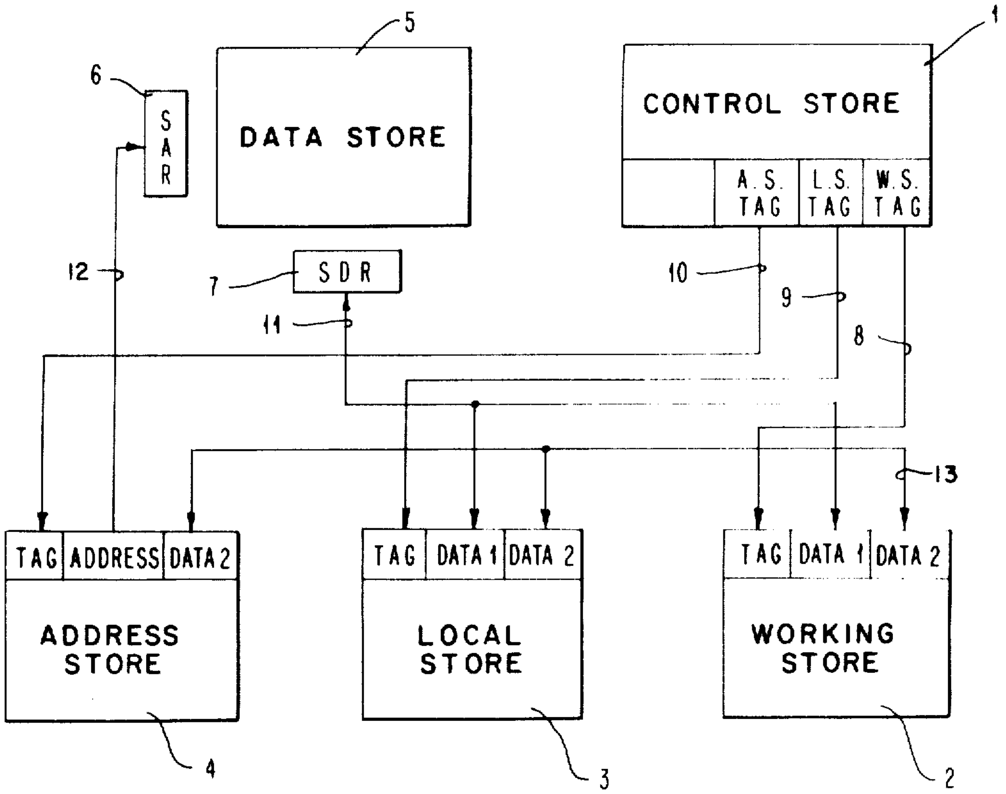
FIG. 1 is a block diagram of an electronic data processing system according to the invention.

FIG. 1 shows an electronic data processing system, according to the invention, which comprises an associative control store 1, an associative working store 2, an associative local store 3, an associative address store 4 and a nonassociative data store 5 which has a storage address register 6 and a storage data register 7. Storage address register 6 is for holding information representing an address in store 5. The information standing in register 6 is interpreted by control circuits (not shown) to access the specified address and to cause data transfer between the storage data register 7 and the specified address. This accessing arrangement is well known and will not further be described. The form of data store 5 is not relevant to the invention, but it could be a magnetic core or thin film store.

The associative stores 1 to 4 are, in the example of the invention being described, constructed as described in the specification accompanying our copending application Ser. No. 825,455, filed on Oct. 23, 1968, which is incorporated herein by this reference. The construction described consists in an associative store comprising a number of word registers each having associated primary and secondary selector triggers. When the contents of a word register matches a search argument, which extends over a field of the register defined by a mask register, a selected one of the selector triggers of the register containing the match is set. Subsequently, the contents of those word registers having a predetermined selector trigger set are accessed simultaneously either for reading their contents to an input/output register or for writing the contents of the input/output register into each accessed register. Usually, but not necessarily, the accessed field is complementary to the field of the search argument, i.e. if the register is four-bytes wide, the search argument may extend over an endmost byte and read or write take place over the remaining three bytes, but, by means of an operation called Next in which the settings of a selected set of selector triggers are transferred to the trigger of the same set, primary or secondary, belonging to the adjacent word register in a given direction, it is possible to access the word registers next to those containing data matching a search argument.

The word registers comprise three-state bit storage cells as described in Application Ser. No. 740,939 filed June 28, 1968, now U.S. Pat. No. 3,543,296, which are associative cells capable of emitting match or no-match signals in accordance with the relationship between a binary interrogation signal and the state of the cell, the cells being able to assume a "don't care" or X state in which they emit match signals irrespective of what interrogation signal is applied. As described in the specification of Application No. 825,455 filed on Oct. 23, 1968, such three-state cells give great flexibility of operation and much economy of store space.

The stores 1 to 5 are interconnected by buses which communicate between the input/output registers (not shown) of the associative stores 1 to 4 and the storage address register 6 and storage data register 7 of data store 5. In the following description the dimensions of the buses are given merely by way of example to illustrate one manner in which the buses may be connected. The system being described is invisaged as performing byte-wide arithmetic, i.e. each operand in an arithmetic or logic operation will comprise one byte (eight bits) of data. Only those buses relevant to the invention have been shown. For overall operation of the system reference should be made to the specification of Application Ser. No. 828,503. The control store word registers include a working store tag field (four bits), a local store tag field (four bits) and an address store tag field (four bits). The tag fields of the control store input/output register are connected to the tag fields of the input/output registers of the appropriate stores by respective buses 8, 9 and 10. The storage data register is two-bytes wide (16 bits) and is connected to two-byte Data 1 fields of the local and working stores by a two byte bus 11. Storage address register 6 is three-bytes wide and is connected to a three-byte Address field of the address store input/output register over a bus 12. One-byte Data 2 fields of the address, local and working stores input/output registers are interconnected by a bus 13.

Figure 2:
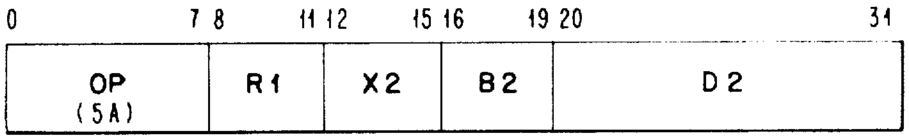
FIG. 2 is the format of a typical instruction executed by a system according to the invention.

In order to understand the operation and significance of the address store, it will be necessary to outline the procedure for executing a typical macroinstruction. The example chosen is taken from the order set of IBM System/360: the RX Add (Fixed-point) instruction, the format of which is shown in FIG. 2.

The instruction is 32 bits long, two half-words of Data Store 5. Bits zero to seven form the operations code field and indicate not only the operation to be performed on the operand or operands defined by the instruction, but also what format the instruction takes, i.e. interpretation of the operation code will determine that the instruction is an RX instruction. Bits eight to 11, the R1 field, give the address of one out of 16 registers which contains the first operand. Bits 12 to 15, the $X_2$ field, give the address of an index register. Bits 16 to 19, the $B_2$ field, give the address of a register, and bits 20 to 31, the $D_2$ field, are a prime number having no address significance per se. The address (effective address) of the second operand is obtained by summing the contents of the $D_2$ field, and the low-order 24 bits contained in the registers specified by the contents of the $X_2$, $B_2$ fields.

The three-byte addresses of instructions are supplied from an instruction counter which occupies a short table held in the address store 4. An example of one form which the instruction counter could take is given in the specification of Application Ser. No. 828,503 filed May 28, 1969. The current setting of the instruction counter is supplied to the storage address register 6 over bus 12 and the first half-word (two bytes) of instruction is read into storage data register 7. The operation code is interpreted in working store 2 and is used to select the microprogram to be executed in accessing the operands defined by an RX instruction. Meanwhile the instruction counter in the address store is being incremented by two in order to address the next half-word of instruction in the data store.

The local store 3 contains the 16 general registers each as four-word registers or lines of the store holding a single byte of data. The first and last lines of a register are associatively accessible but the intervening lines are only accessible by accessing the first line and performing a next operation. Since the operation code interpretation has shown that the instruction is an RX instruction, the incremented instruction count is used to read the second half-word of the instruction to the local and working stores. For simplicity it is assumed that the index is zero so that to form the effective address it is merely necessary to sum the displacement $D_2$ and the contents of the register specified by field $B_2$ byte by byte.

As each sum byte if formed, it is emitted from the working store to the address store over bus 13 and the address store shifts the byte to the Address field.

Figure 3:
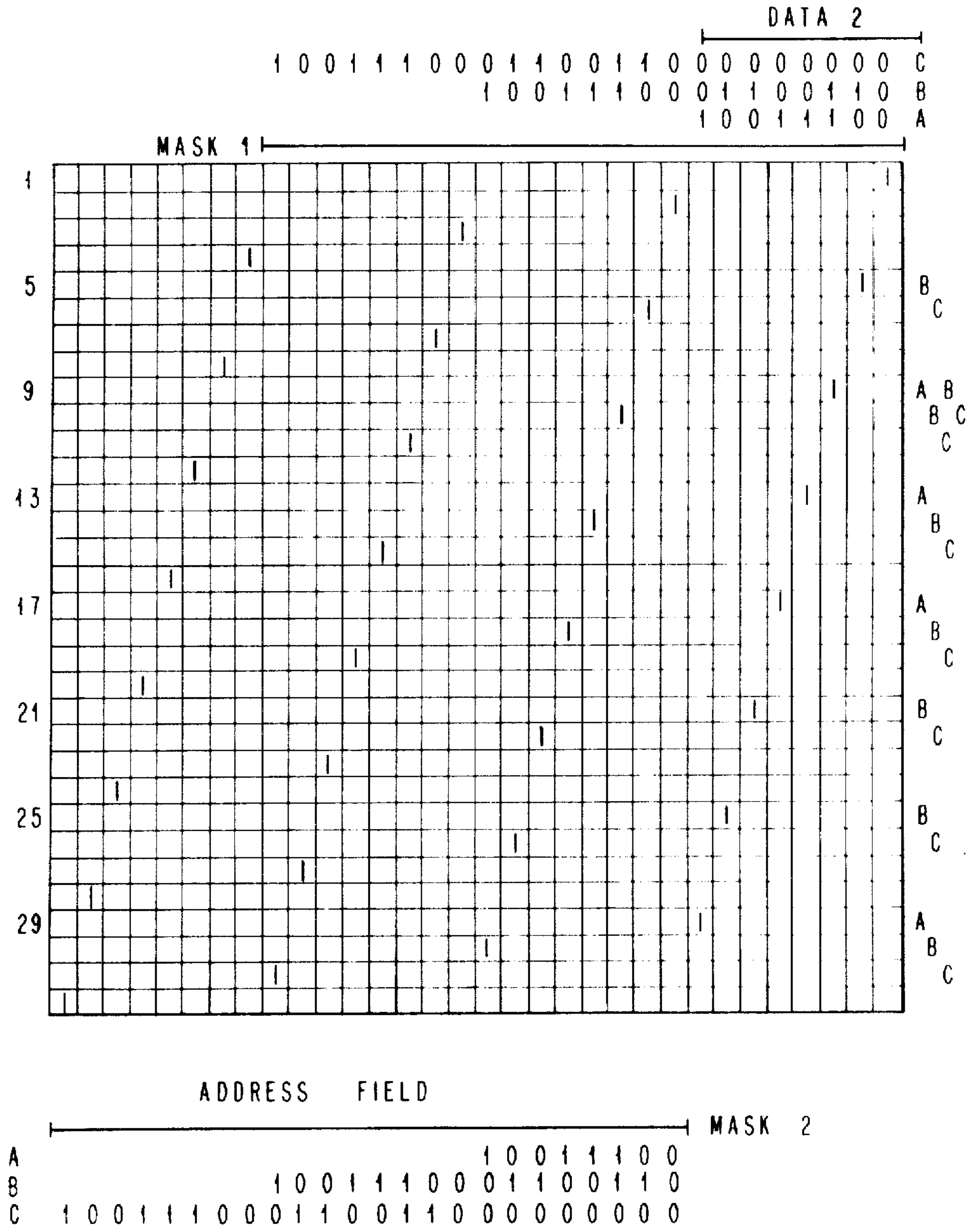

Shifting is done by the table shown in FIG. 3 which is four-bytes wide and 32 lines long. Each line of the table is part of a word register and FIG. 3 shows those data cells which are set to the 1 state. The remaining cells are set to the X or "don't care" state which causes an output of zero to the input/output register. The operation defined on the table is Select, Next, Mask 1, Read, Mask 2, i.e. compare the contents of the input/output register with the table entries over the field Mask 1, the right three bytes of the table; if the input matches a line of the table set the selector trigger of the next line; finally, read out to the input/output register the field defined by Mask 2 of those lines with selector trigger set. Mask 2 which extends over the left three bytes of the table is arranged to coincide with the address field of the address store 4. Data is entered byte by byte over bus 13, i.e. in the data 2 field of the address register. An example is shown in FIG. 3 of three successive uses A, B, C of the table. The first byte matches lines 9, 13, 17 and 29 of the table, causing the selection of lines 10, 14, 18 and 30 for readout and resulting in a one-byte left shift of the input. Since Masks 1 and 2 overlap, the output of the first operation is an input of the second use B together with a new byte in the data 2 field.

The aligned address of the second operand is applied to the storage address register and the first two bytes read to the storage data register. The bytes are successively added to the corresponding bytes of the register defined by the R1 field, and while this is being done the second operand address is being modified, in fact decremented, in the address store 4 to define the address of the second two bytes of the second operand. At an appropriate time this address is applied to the storage address register and the second two bytes of the second operand are read to the storage data register. The bytes are summed with the contents of the register defined by the R1 field while the address store increments the instruction count ready to access the next instruction first half-word.

It is possible that, due to programming or other error, an invalid memory address may be generated during an instruction execution. Normally there are constraints on the size and location of the store area from which operand data can be taken. Further constraints may arise from the type of addressing used. As an example of the former type of constraint, a valid address could be required to have the third, highest order, byte identically zero. As an example of the latter, each storage location of the data store may contain only a single byte and yet each operand, at least in fixed point operation, may comprise a fixed number of half-words, each consisting of two bytes. A valid operand address may in this case be required to be an even binary number, i.e. the lowest order bit of the address must be zero.

Two alternative methods of detecting invalid memory addresses may be used. The address field may be applied to the table shown in FIG. 4 which detects the presence of one bits in the highest order byte or the lowest order bit. If a 1 bit is detected one of the lines of the table is selected and the error bit E is subsequently read out. Alternatively, error bits could be added to lines of the shift table of FIG. 3. The table width could be extended by two bit positions. In one of the extra positions an error bit is added to line 30 of the table. In the other extra position, error bits are added to lines 2, 6, 10, 14, 18, 22, 26 and 30. If there is a one bit in the lowest order bit of a byte line 30 is selected. If line 30 is selected on the first use of the table, cycle A, this means that the lowest order bit of the address is nonzero. The error indication from this bit position can be ignored during the second and third cycles. The other error bits indicate nonzero bits in the byte and their detection during the third cycle indicate an invalid address. The error indication from this bit position can be ignored during the first and second cycles.

Execution of an RX Add (Fixed-point) instruction is summarized in the table of FIG. 5 which indicates the microinstructions being performed in each store during each cycle of the system. Although a detailed exposition of FIG. 5 will not be given, a brief explanation of the terms appearing in the table follows.

IC stands for instruction count. Since each instruction is at least two bytes long, the count can be incremented by 2 in the address store during execution of an instruction. Further incrementing can take place, if found to be necessary by OP decode, at the beginning of execution of the next instruction.

"Save" means store temporarily in a word register for future reference. This contrasts with "Store" which implies greater permanence of storage. Thus, the OP code is saved until all the information necessary for instruction execution has been extracted whereas the results of the addition are stored. "-Maintain" means keep the contents of the bus unchanged for the next cycle, i.e. prevent clearing or overwriting on the bus to which the order refers.

"Move" is a microinstruction which effectively shifts data in one part of the input/output register to another part. It is used to align operands. It will be noted that at one stage the Address Store is required to introduce a one bit to bit 30 of the effective address. This is to define the address of the low order half-word of the RX operand. The effective address for an RX instruction is the address of the highest order byte of the eight-byte operand, i.e. the address always ends in two binary zeros. When it is accessed by half-word as here, it is necessary to add 2 to the effective address to get the address of the low order half-word. It will be noted that later the effective address is decremented by two in order to get the address of the high-order two bytes or half-word.

The present description has shown that the introduction of a specialized functional store for address data manipulation can lead to improvement in the performance of the system described in the specification of Application Ser. No. 828,503.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electronic data processing system comprising an associative working store, a control store with which the working store is connected for the execution, under the control of the control store, of functions by the use of table-look-up procedures on function tables stored in the working store, a nonassociative data store having a storage data register operatively connected to said working store and an associative address store which connected to the control store and working store, for the execution, under the control of the control store and by the use of table-look-up procedures on function tables stored in the address store, functions on address data to be used in addressing the data store, said data store having a storage address register which is operatively connected to said address store for receiving address data therefrom, the arrangement being such that simultaneous function execution can take place in the working and address stores.

2. A system as claimed in claim 1, wherein the control store comprises a plurality of word registers each for holding a word including a working store tag and an address store tag, the system including means for transferring simultaneously to the working and address stores respectively, the working store and address store tags of a selected word, whereby simultaneous function execution can take place in the working and address stores.

3. A system as claimed in claim 2, wherein the search argument for a table-look-up procedure in the address store comprises the address store tag supplied by the control store which tag includes data defining the function table to be used in the procedure, and a part supplied by the control store which includes data defining the entry or entries to be accessed.

4. A system as claimed in claim 1, wherein the data store has a storage address register which is connected to the address store for transfer of address data from the address store to the storage address register.

5. A system as claimed in claim 2, wherein the data store has a storage address register which is connected to the address store for transfer of address data from the address store to the storage address register.

6. A system as claimed in claim 3, wherein the data store has a storage address register which is connected to the address store for transfer of address data from the address store to the storage address register.

7. A system as claimed in claim 1, wherein the data store has a storage data register which is connected to the working store for transfer of data between the working store and the storage data register.

8. A system as claimed in claim 2, wherein the data store has a storage data register which is connected to the working store for transfer of data between the working store and the storage data register.

9. A system as claimed in claim 3, wherein the data store has a storage data register which is connected to the working store for transfer of data between the working store and the storage data register.

10. A system as claimed in claim 4, wherein the data store has a storage data register which is connected to the working store for transfer of data between the working store and the storage data register.

11. A system as claimed in claim 5, wherein the data store has a storage data register which is connected to the working store for transfer of data between the working store and the storage data register.

12. A system as claimed in claim 6, wherein the data store has a storage data register which is connected to the working store for transfer of data between the working store and the storage data register.

* * * * *